US009785541B1

(12) United States Patent
Elgarat

(10) Patent No.: US 9,785,541 B1
(45) Date of Patent: Oct. 10, 2017

(54) SYSTEM, METHOD, AND COMPUTER PROGRAM FOR GENERATING TEST REPORTS SHOWING BUSINESS ACTIVITY RESULTS AND STATUSES

(71) Applicant: Amdocs Software Systems Limited, Dublin (IE)

(72) Inventor: Sharon Elgarat, Kibbutz Mefalsim (IL)

(73) Assignees: Amdocs Software Systems Limited, Dublin (IE); Amdocs Development Limited, Limassol (CY)

(*) Notice: Subject to any disclaimer, the term of this patent is extended or adjusted under 35 U.S.C. 154(b) by 0 days.

(21) Appl. No.: 14/828,392

(22) Filed: Aug. 17, 2015

(51) Int. Cl.
*G06F 9/44* (2006.01)
*G06F 11/36* (2006.01)

(52) U.S. Cl.
CPC .............. *G06F 11/368* (2013.01); *G06F 8/70* (2013.01); *G06F 11/3688* (2013.01)

(58) Field of Classification Search
None
See application file for complete search history.

(56) References Cited

U.S. PATENT DOCUMENTS

| 8,359,580 B2 | 1/2013 | Gonzales et al. | |
| 9,032,259 B1* | 5/2015 | Hood | G06F 11/34 714/57 |
| 2007/0226546 A1* | 9/2007 | Asthana | G06F 11/3688 714/47.1 |
| 2009/0169008 A1 | 7/2009 | Gonzales et al. | |
| 2013/0185056 A1* | 7/2013 | Ingram | G06F 11/3684 704/9 |
| 2014/0165043 A1* | 6/2014 | Pasala | G06Q 10/0633 717/124 |
| 2015/0347282 A1* | 12/2015 | Wingfors | G06F 11/3688 717/125 |

OTHER PUBLICATIONS

"Generating Test Cases from UML Activity Diagram based on Gray-Box Method", Wang et al., 2004.*

* cited by examiner

*Primary Examiner* — Daxin Wu
(74) *Attorney, Agent, or Firm* — Zilka-Kotab, PC

(57) ABSTRACT

A system, method, and computer program product are provided. At least one testing project to be performed is identified, and a diagram is generated from testing activities including parameters with multiple values which includes one or more test flows including the testing activities. The one or more test flows include a plurality of possible testing scenarios. Further, scenarios are extracted from the generated diagram, and a test list to be executed is generated utilizing the extracted scenarios where each test case in the test list retains a link to a corresponding testing activity in the generated diagram. Still yet, the test list is, and at least one report is generated based on the execution of the test list which shows the generated diagram and a result of the execution corresponding to a testing activity based on an associated retained link.

8 Claims, 4 Drawing Sheets

овBcomingsessionSignal nutritionAnfangLtd.
SYSTEM, METHOD, AND COMPUTER PROGRAM FOR GENERATING TEST REPORTS SHOWING BUSINESS ACTIVITY RESULTS AND STATUSES

FIELD OF THE INVENTION

The present invention relates to software testing projects, and more particularly to generating test reports showing business activity results and statuses.

BACKGROUND

The testing of software is a critical step in the software development lifecycle. The objective of the testing is to verify and validate the integration of the software, the hardware and the configuration thereof, and to prevent malfunction of the software when in use.

Crucial steps to avoiding inefficiencies in software testing include developing and managing effective test plans. Test planning is a stage in all testing projects where test managers prepare the project and organize in deliverable documents the strategy, resources, travels, and overall project plan for all activities needed in the project. Current techniques for showing test results for user acceptance testing, etc., are limited.

There is thus a need for addressing these and/or other issues associated with the prior art.

SUMMARY

A system, method, and computer program product are provided for generating test reports showing business activity results and statuses. In use, at least one testing project to be performed is identified. Additionally, a diagram is generated from testing activities including parameters with multiple values. The generated diagram includes one or more test flows including the testing activities to perform in association with the at least one testing project. The one or more test flows include a plurality of possible testing scenarios. Further, scenarios are extracted from the generated diagram. In addition, a test list to be executed is generated. The test list is generated utilizing the extracted scenarios from the generated diagram and each test case in the test list retains a link to a corresponding testing activity in the generated diagram. Still yet, the test list is executed including each of the test cases associated with the extracted scenarios. Moreover, at least one report is generated based on the execution of the test list. The at least one report includes the generated diagram and a result of the execution corresponding to a testing activity based on an associated retained link.

DETAILED DESCRIPTION

Figure 1:
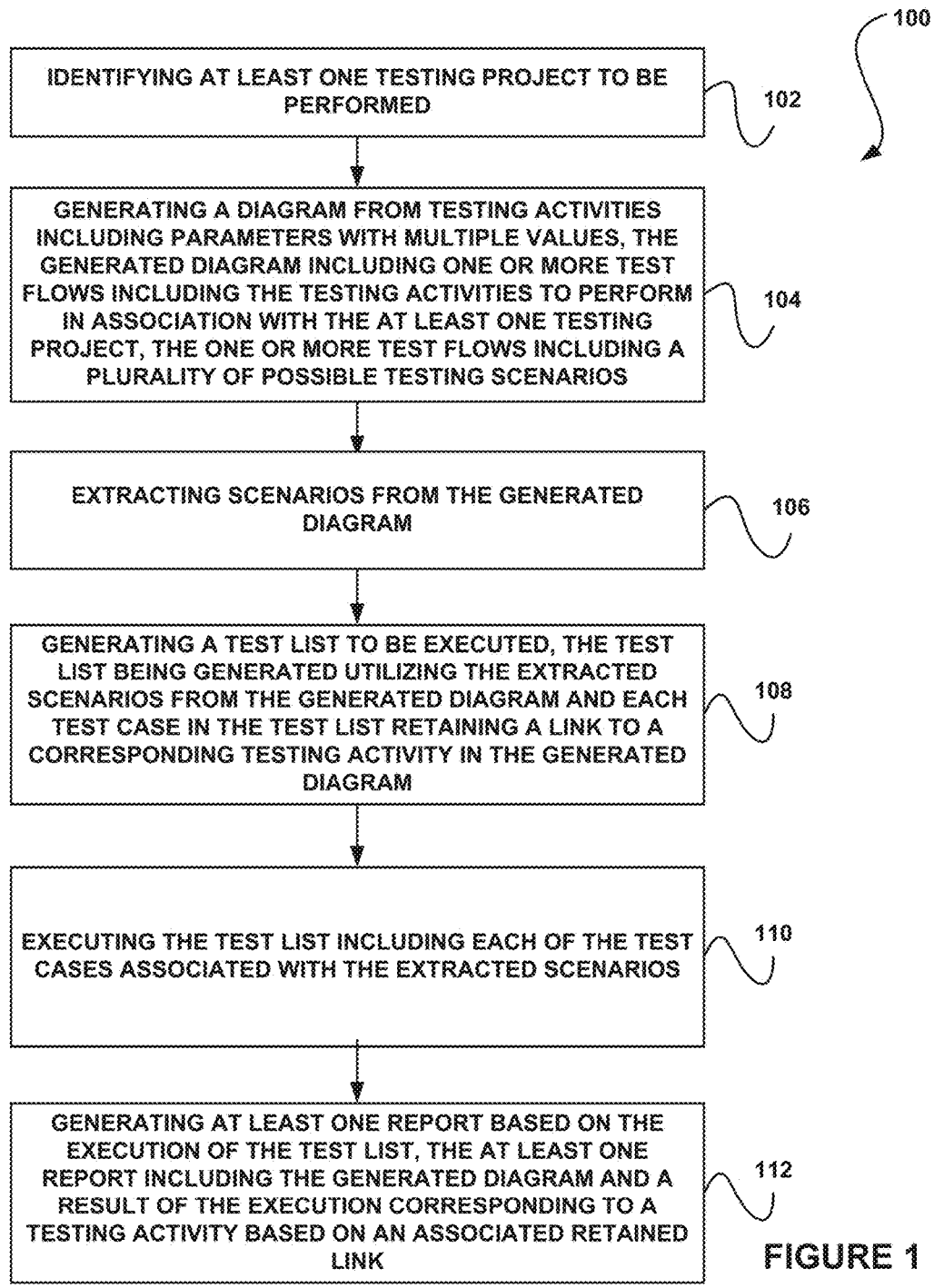
FIG. 1 illustrates a method for generating test reports showing business activity results and statuses, in accordance with one embodiment.

FIG. 1 illustrates a method 100 for generating test reports showing business activity results and statuses, in accordance with one embodiment.

As shown, at least one testing project to be performed is identified. See operation 102. The testing project may include any type of software testing project and may be a portion of a larger testing project or an entire project. The testing project may also be associated with any stage of testing, such as, for example, user acceptance testing, etc. Moreover, the testing project may be associated with any industry, such as the telecommunications industry, etc.

Additionally, a diagram is generated from testing activities including parameters with multiple values. See operation 104. The generated diagram includes one or more test flows including the testing activities to perform in association with the at least one testing project. The one or more test flows include a plurality of possible testing scenarios. The generated diagram displays the testing activities as at least one test flow.

The testing activities to be performed as part of the test may include any specific or generic step, process, method, or other action associated with the test or business activity to be tested. The testing activities may be identified by a user configuring the test. The testing activities may describe tests within a flow. For example, the user may select or define the actions to perform as part of the test and associated parameters, etc., utilizing a user interface.

Further, scenarios are extracted from the generated diagram, from the plurality of possible testing scenarios. See operation 106. The scenarios may be identified and/or extracted from the generated diagram based on a variety of criteria, such as, for example, business priority, customization level, and past risk probability.

In addition, a test list to be executed is generated. See operation 108. The test list is generated utilizing the extracted scenarios from the generated diagram and each test case in the test list retains a link to a corresponding testing activity in the generated diagram.

Still yet, the test list is executed, including each of the test cases associated with the extracted scenarios. See operation 110. In various embodiments, executing the test list may include a scenario by scenario sequence execution, or a parallel mode execution for multiple scenarios progressing side by side.

Moreover, at least one report is generated based on the execution of the test list. See operation 112. The at least one report includes the generated diagram and a result of the execution corresponding to a testing activity based on an associated retained link.

The report displays the generated diagram including the testing activities and results associated with the testing activities. The report may display a variety of results for each activity.

For example, the report may show an execution rate, pass rate, and/or activity status for each of the activities displayed. Execution rate refers to the ratio of tests executed out of the total tests linked to the business activity. Pass rate refers to the ratio of tests that passed out of the total executed tests. Activity status refers to a color coding status representation, showing whether the activity's tests started execution, and if they have a high, medium or pure pass rate. The report may also show a number of defects associated with each activity that occurred.

Regardless of the specific result displayed, the results associated with the testing activities may be capable of being selected to show additional drill-down information associated with the results. Additionally, in one embodiment, statuses associated with the testing activities may be shown utilizing at least one of a coloring scheme and status parameters on the diagram.

Further, in one embodiment, a user may indicate a mode in which the tests are to be run. For example, a selection may be received of a prediction mode of operation or a current project mode of operation.

The prediction mode of operation may cause generation of the report based on historical data associated with one or more past testing projects. In this case, during test execution the prediction mode of operation may be capable of being used to constantly evaluate issues found and a validity of proposed workaround solutions for blocking defects.

The current project mode of operation may cause generation of the report based on current data associated with the testing project. Additionally, the current project mode of operation may be operable such that the report represents a real status of business flows the generated diagram presents from all tests deemed required to be performed to properly cover a testing scope.

Further, in one embodiment, defect information may be reported during execution of the test list (e.g. by a user utilizing a user interface, etc.). Additionally, each executed test may retain a link to a corresponding testing activity in the generated diagram from which the test was derived and each defect reported may contain a link to a corresponding test the defect impacts such that the defect is mapped to the testing activity in the generated diagram that the defect impacts.

Thus, the method 100 may be implemented by a system for testing prediction and results reporting, which provides the customer a report based on business activities.

For example, during the test design, the test cases can be generated from a diagram view of the scope, describing flows of business activities. Each test retains a link to the business activity element in the diagram from which it was derived. This link allows presenting a report on business activity level by aggregating the tests by their linked activity.

The report shows the status on the progression of the business process, indicating either in prediction mode (from past projects data) or real results mode (from current project data) the quality of the activity within the flow and the errors (critical and high defects) to provide the customer all needed information to make accurate operative decisions (e.g., Go Live) based on the location of the issues in the process and not just based on cold numbers.

In addition, in one embodiment, the drill down capabilities of the report may be used as platform for automated test execution for defect retest and regression testing for the areas impacted by the fix of the defect. Links between the defect and the tests needed to reproduce it may be kept by the diagram scenarios which produced the defect thus allowing automated test execution to be performed both to reproduce the exact scenario which reproduces the defect and all other scenarios which reach the same activity in the diagram and therefore are at risk of presenting regression impact by the fix introduced.

This allows users to focus testing on highest risk paths within the business process, allows users to present to the customer unstable areas within a solution even before running a single test case, and allows users to identify the error points to facilitate a partial decision of agile elements in the flow. Moreover, such techniques ignore the mathematically selected scenarios to provide an overall flow breakdown of the status and use simple graphical concepts to illustrate the business flow and the severity of issues.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
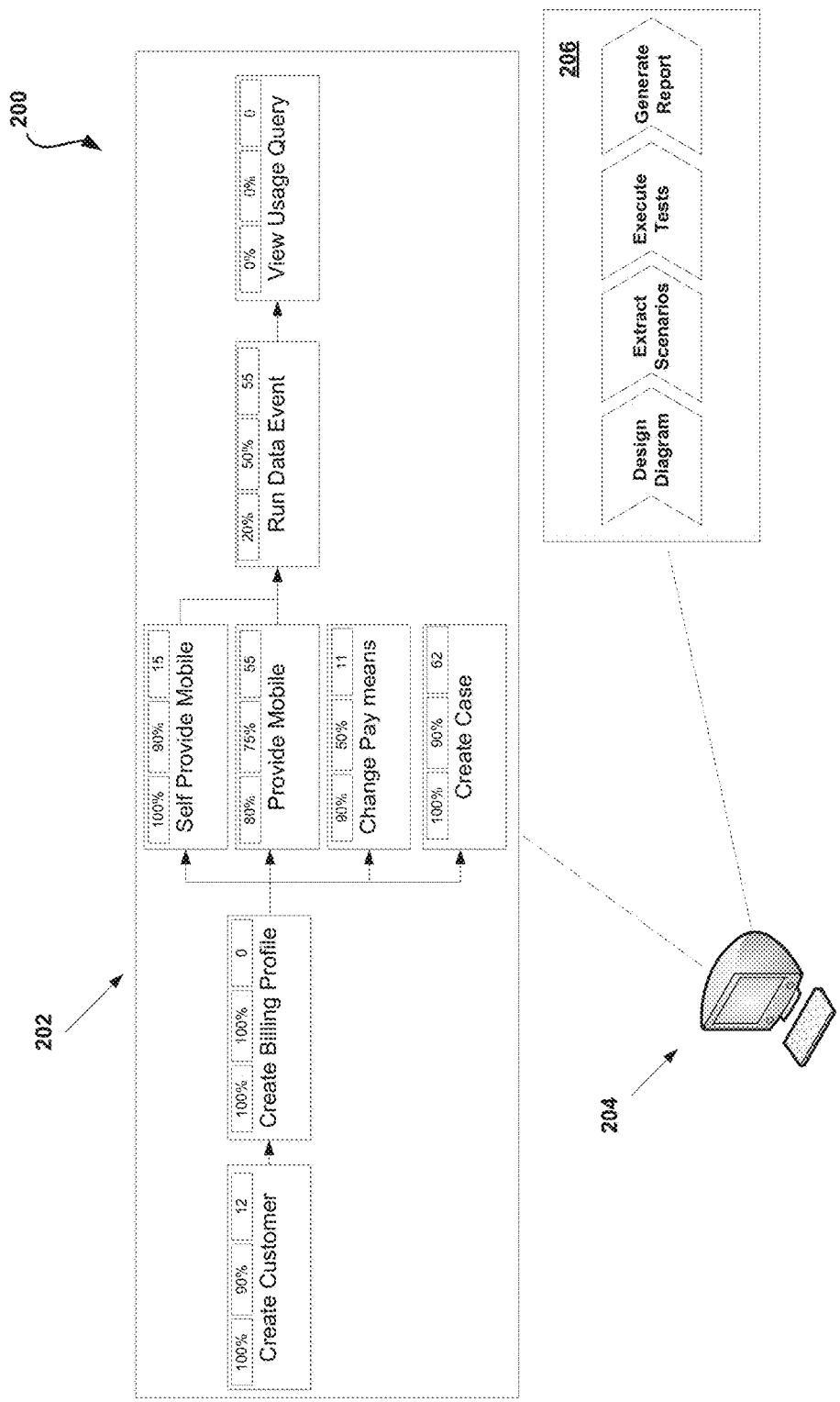
FIG. 2 illustrates a system for testing prediction and results reporting, in accordance with one embodiment.

FIG. 2 illustrates a system 200 for testing prediction and results reporting, in accordance with one embodiment. As an option, the system 200 may be implemented in the context of the details of FIG. 1. Of course, however, the system 200 may be implemented in the context of any desired environment. Further, the aforementioned definitions may equally apply to the description below.

The system 200 may be implemented for providing testing predictions and enhanced test results reporting by correlating them to their business activity context.

In operation, a testing system 204 may implement a process 206 for correlating a testing process to its business activity context. As shown, the process includes designing a diagram, extracting scenarios, executing tests, and generating reports.

The output of the report is a graphical description of the process with information to provide a one shot view of the status/predicted state for all business activities in a scope (e.g. by using a coloring scheme and status parameters, etc.). An example of such graphical description is depicted by a graph/report 202.

With respect to the testing process 206, a diagram is produced from generic testing activities, which include parameters with multiple values. The activities are chained into a diagram flow allowing one or more paths of activities, as shown in the graph 202. Each full chain of activities contains a large range of possible scenarios, each described by a specific permutation of selected values at each parameter in the chain of activities.

In one embodiment, the system 204 may be connected to a database that stores previous project tests which were derived from the same activities used in a current diagram.

The link kept between the source activity and the final test case allows the usage of a data analytics system to present an expected test status prediction report even before tests were created from the diagram.

The test status can contain details such as predicted pass rate and predicted critical/high defects count per activity in the flow. The analytics system calculates the values based on the historical data from a wide range of projects classified as relevant for the designed business process in the testing project and linked to the same business activities used in the diagram.

The created diagram may represent a vast amount of optional testing scenarios, out of which, the test designer may extract scenarios while taking into consideration elements such as business priority, customization level, past risk probability, represented in the prediction mode of the report, and mathematical coverage algorithms (e.g. such as Pairwise, etc.).

The sum of all consideration elements provides a best fit scenarios list which are full chain permutations, each made from multiple business activities but covering only one value out of the options allowed for each parameter.

Following the extract scenarios process, a test list is created, which then can be executed. The execution of the tests can be done in multiple ways, including a scenario by scenario sequence or in a parallel mode for multiple scenarios progressing side by side.

During the tests, the executer may report defects. Each of the executed tests retains a link to the activity in the diagram from which it was derived. Each defect reported contains a link to the tests it impacts so it could also be mapped to the business activity in the diagram which it impacts.

During test execution, a prediction mode can be used to constantly evaluate issues found and the validity of proposed workaround solutions for blocking defects.

In a 'real results' mode, the report may show the same diagram of business activities from the design. However, in this mode, the execution rate, pass rate, and defects are collected from current project tests by using this link between the business activity in the diagram and the many tests generated in multiple scenarios. This allows the system 204 to represent the real status of the business flows the diagram presents from all tests deemed required to perform to properly cover the scope.

The business activity status can be presented on the diagram at three levels: execution rate, pass rate, and activity status. Execution rate is the ratio of tests executed out of the total tests linked to the business activity. Pass rate is the ratio of tests which passed out of the total executed tests. Activity status is a color coding status representation, showing whether the activity's tests started execution, and if they have a high, medium or pure pass rate.

In addition, using a link saved during execution between the defect and the test on which it was detected, the report can gather a fourth element and present the count of critical and high open defects in the activity.

The above process may use a visual feedback means, like integrated console, which can automatically reuse the created diagram, identify the entities in the diagram as generic activities, retain the link to the final tests and defects and aggregate the entire data. This may provide an automatic reporting means representing the clear business understanding oriented progress status report.

Past reporting techniques focused on the final selected tests, without giving the tested the ability to revert back to the original scope view. The techniques/systems described herein solve this limitation and present the status on the original scope diagram view, shifting the focus from the selected specific test scenarios back to a full scope based report describing the status on top of the business process, thus allowing the viewer a clear understanding of the impact of each issue and clarity on the coverage of the currently executed tests at every point in the execution period.

Figure 3:
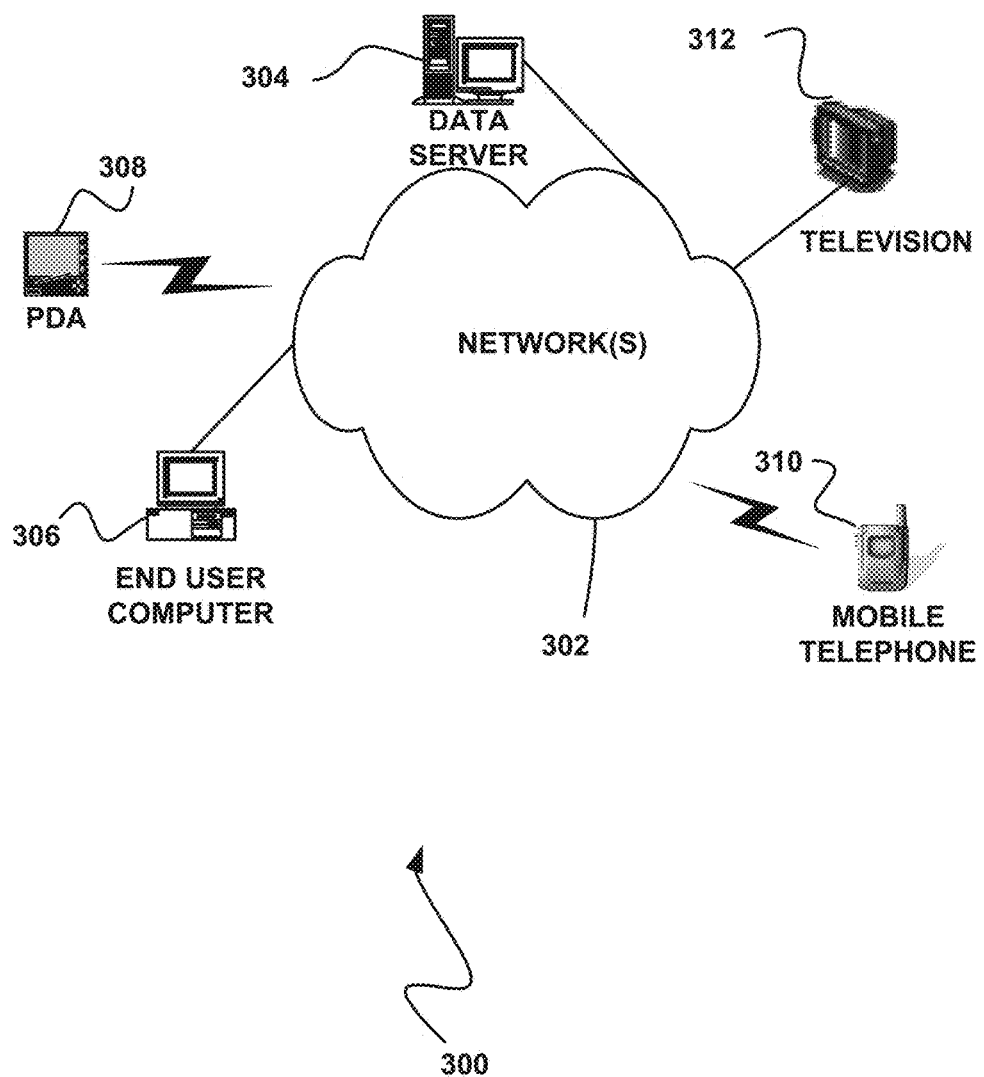
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
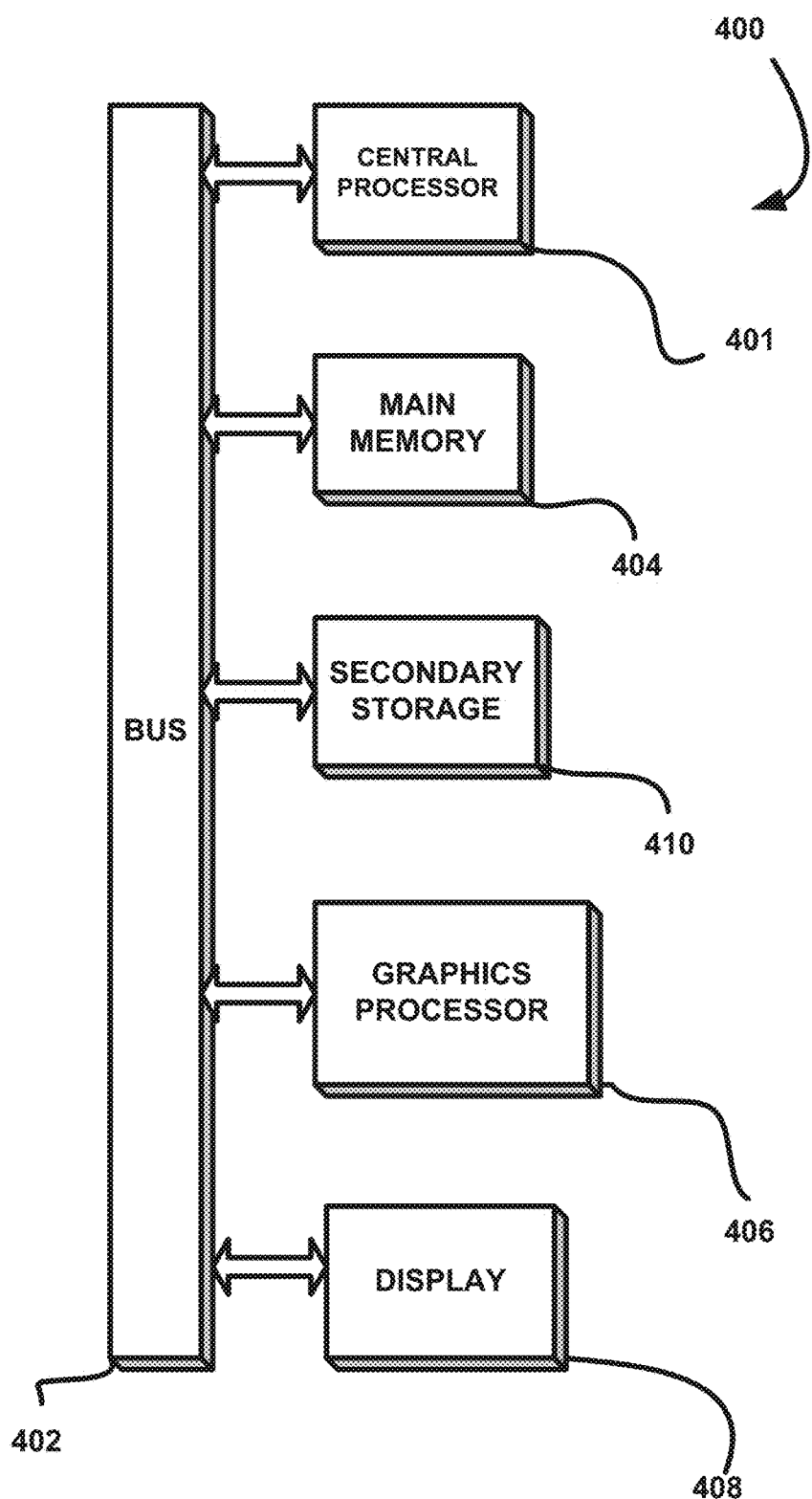
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, the computer program product including computer code executable by a processor to perform a method comprising:

identifying at least one testing project to be performed at least one testing project being identified from a database that also stores other testing projects;

generating a diagram having one or more test flows, the one or more test flows each including a path of testing activities to perform in association with the at least one testing project, and each of the testing activities having a parameter with a plurality of possible values;

predicting a defect count for each of the testing activities in the generated diagram, based on historical data associated with at least a portion of the other testing projects stored in the database that are classified as relevant to the at least one testing project and that have the same testing activities included in the generated diagram;

presenting the predicted defect count for each of the testing activities in a prediction report for the at least one testing project;

identifying a plurality of possible scenarios from the generated diagram, each possible scenario of the plurality of possible scenarios being for a different path of testing activities and being described by a different permutation of the possible values for the parameters of the testing activities in the path;

extracting scenarios from the identified plurality of possible scenarios, based on at least one of business priority, customization level, and past risk probability;

generating a test list to be executed, the test list including test cases for the extracted scenarios and each of the test cases in the test list retaining a link to a corresponding testing activity in the generated diagram;

executing the test list including each of the test cases associated with the extracted scenarios; and generating at least one report based on the execution of the test list, the at least one report showing the generated diagram having the testing activities, and showing on each of the testing activities a result of the test case execution corresponding to the testing activity identified based on the associated retained link, the result shown on each testing activity in the generated diagram including:
a ratio of test cases executed out of the total test cases linked to the business activity,
a ratio of test cases that passed out of the total executed test cases,
an activity status showing whether test cases for the testing activity have started execution, and
a number of defects that occurred for the testing activity;
wherein drill down capabilities of the report may are used as a platform for automated test case execution for defect retest and regression testing for areas impacted by a fix of a defect.

2. The computer program product of claim 1, wherein the computer program product is operable such that the results associated with the testing activities are capable of being selected to show additional drill-down information associated with the results.

3. The computer program product of claim 1, wherein the computer program product is operable such that the activity statuses associated with the test cases are shown utilizing at least one of a coloring scheme and status parameters on the generated diagram.

4. The computer program product of claim 1, wherein the computer program product is operable such that executing the test list includes a scenario by scenario sequence execution.

5. The computer program product of claim 1, wherein the computer program product is operable such that executing the test list includes a parallel mode execution for multiple scenarios progressing side by side.

6. The computer program product of claim 1, wherein the computer program product is operable such that each defect reported contains a link to a corresponding test case the defect impacts such that the defect is mapped to the testing activity in the generated diagram which the defect impacts.

7. A method, including:
identifying at least one testing project to be performed, the at least one testing project being identified from a database that also stores other testing projects;
generating a diagram having one or more test flows, the one or more test flows each including a path of testing activities to perform in association with the at least one testing project, and each of the testing activities having a parameter with a plurality of possible values;
predicting a defect count for each of the testing activities in the generated diagram, based on historical data associated with at least a portion of the other testing projects stored in the database that are classified as relevant to the at least one testing project and that have the same testing activities included in the generated diagram;
presenting the predicted defect count for each of the testing activities in a prediction report for the at least one testing project;
identifying a plurality of possible scenarios from the generated diagram, each possible scenario of the plurality of possible scenarios being for a different path of testing activities and being described by a different permutation of the possible values for the parameters of the testing activities in the path;
extracting scenarios from the identified plurality of possible scenarios, based on at least one of business priority, customization level, and past risk probability;
generating a test list to be executed, the test list including test cases for the extracted scenarios and each of the test cases in the test list retaining a link to a corresponding testing activity in the generated diagram;
executing the test list including each of the test cases associated with the extracted scenarios; and
generating at least one report based on the execution of the test list, the at least one report showing the generated diagram having the testing activities, and showing on each of the testing activities a result of the test case execution corresponding to the testing activity identified based on the associated retained link, the result shown on each testing activity in the generated diagram including:
a ratio of test cases executed out of the total test cases linked to the business activity,
a ratio of test cases that passed out of the total executed test cases,
an activity status showing whether test cases for the testing activity have started execution, and
a number of defects that occurred for the testing activity;
wherein drill down capabilities of the report may are used as a platform for automated test case execution for defect retest and regression testing for areas impacted by a fix of a defect.

8. A system comprising:
a memory system; and
one or more processing cores coupled to the memory system and that are each configured to:
identify at least one testing project to be performed, the at least one testing project being identified from a database that also stores other testing projects;
generate a diagram having one or more test flows, the one or more test flows each including a path of testing activities to perform in association with the at least one testing project, and each of the testing activities having a parameter with a plurality of possible values;
predict a defect count for each of the testing activities in the generated diagram, based on historical data associated with at least a portion of the other testing projects stored in the database that are classified as relevant to the at least one testing project and that have the same testing activities included in the generated diagram;
present the predicted defect count for each of the testing activities in a prediction report for the at least one testing project;
identify a plurality of possible scenarios from the generated diagram, each possible scenario of the plurality of possible scenarios being for a different path of testing activities and being described by a different permutation of the possible values for the parameters of the testing activities in the path;
extract scenarios from the identified plurality of possible scenarios, based on at least one of business priority, customization level, and past risk probability;
generate a test list to be executed, the test list including test cases for the extracted scenarios and each of the test cases in the test list retaining a link to a corresponding testing activity in the generated diagram;
execute the test list including each of the test cases associated with the extracted scenarios; and
generate at least one report based on the execution of the test list, the at least one report showing the generated diagram having the testing activities, and showing on each of the testing activities a result of the test case execution corresponding to the testing activity identified based on the associated retained link, the result shown on each testing activity in the generated diagram including:
a ratio of test cases executed out of the total test cases linked to the business activity,
a ratio of test cases that passed out of the total executed test cases,
an activity status showing whether test cases for the testing activity have started execution, and
a number of defects that occurred for the testing activity;
wherein drill down capabilities of the report may are used as a platform for automated test case execution for defect retest and regression testing for areas impacted by a fix of a defect.

* * * * *